United States Patent [19]
Christensen

[11] Patent Number: 4,877,057
[45] Date of Patent: Oct. 31, 1989

[54] PRESSURE EQUALIZING VALVE

[75] Inventor: Bruce C. Christensen, Marinette, Wis.

[73] Assignee: Wormald, U.S. Inc., Marientte, Wis.

[21] Appl. No.: 120,014

[22] Filed: Nov. 13, 1987

Related U.S. Application Data

[62] Division of Ser. No. 839,143, Mar. 12, 1986, Pat. No. 4,722,358.

[51] Int. Cl.⁴ .......................................... G05D 11/03
[52] U.S. Cl. ................................ 137/625.48; 137/101
[58] Field of Search .................... 137/101, 117, 625.48; 60/422

[56] References Cited

U.S. PATENT DOCUMENTS

| | | | |
|---|---|---|---|
| 1,925,109 | 9/1933 | Olson | 137/625.48 |
| 2,140,735 | 12/1938 | Clark | 137/625.48 X |
| 2,643,664 | 6/1953 | Willett | 137/101 |
| 2,707,480 | 5/1955 | Klosse | 137/101.11 |
| 2,799,995 | 7/1957 | Herman | 60/422 X |
| 2,870,776 | 1/1959 | Marsh | 137/100 X |
| 3,047,003 | 7/1962 | Gurney | 137/114 X |
| 3,421,533 | 1/1969 | Conn | 137/101 |
| 3,608,587 | 9/1971 | Zbell | 137/625.66 |
| 3,618,628 | 11/1971 | Kramer | 137/101 |
| 3,762,443 | 10/1973 | Sorenson | 137/625.27 |
| 3,797,525 | 3/1974 | Lieser | 137/625.6 |
| 3,979,908 | 9/1976 | Alderson | 137/101 X |
| 4,580,590 | 4/1986 | Brinkel et al. | 137/106 |

FOREIGN PATENT DOCUMENTS

| | | | |
|---|---|---|---|
| 615974 | 1/1949 | United Kingdom | 137/625.48 |
| 1224873 | 3/1971 | United Kingdom . | |
| 1396884 | 6/1975 | United Kingdom | 137/625.48 |
| 1423479 | 2/1976 | United Kingdom . | |

Primary Examiner—Robert G. Nilson
Attorney, Agent, or Firm—Morgan & Finnegan

[57] ABSTRACT

A pressure equalizing valve comprises a valve body with a longitudinally disposed bore therein, and a spool disposed in the bore for longitudinal movement to regulate fluid communication from an inlet port to outlet ports in response to a pressure differential between first and second sense ports disposed on first and second end faces of the valve body.

10 Claims, 2 Drawing Sheets

PRESSURE EQUALIZING VALVE

This is a divisional of co-pending application Ser. No. 06/839,143 filed Mar. 12, 1986, now U.S. Pat. No. 4,722,358.

BACKGROUND OF THE INVENTION

1. Field Of The Invention

This invention relates to valves, and more particularly, to a pressure euqalizing valve for use in a foam fire fighting system.

2. Description Of The Prior Art

Balanced pressure proportioning systems are used in the fire fighting industry to provide a predetermined concentration of fire fighting foam solution to foam distribution hardware in order to control and extinguish fires. The main components of a fire fighting foam system are a balanced pressure proportioner, a diaphragm valve for controlling pressure, a foam concentrate pump or other source of pressurized foam, a foam concentrate supply tank, and a source of water.

The balanced pressure proportioner in the system operates to balance or mix the foam concentrate with the water. The balanced pressure proportioner utilizes a venturi in the water line and an orifice in the foam line. Upon equal pressures of the foam and water, a predetermined mixture of the two occurs.

Consequently, the pressure of the foam in the foam inlet line must equal the pressure in the water line to the proportioner for the predetermined mixture of the two to occur. The foam concentrate pump of the system is designed so that it will supply foam concentrate at a pressure equal to the maximum pressure of the water flow, plus a predetermined safety factor.

The water pressure and flow vary due to water supply variations, as well as different types of foam discharge equipment. The foam pump, on the other hand, supplies the foam concentrate at a constant flow and pressure. Thus, the proportion of foam and water, and hence, the solution concentration, varies along with variations in the water pressure and flow.

A diaphragm valve and by-pass line are known devices used to maintain the foam solution at a predetermined mixture. The known diaphragm valve has a diaphragm disposed within a housing that is connected by a shaft to a double seat globe valve. Foam concentrate is supplied through sensing lines to one side of the diaphragm. Water pressure is supplied to the other side of the diaphragm. When the water pressure is lower than the foam concentrate pressure, the globe valve opens, relieving pressure in the foam concentrate line, and allowing excess concentrate to return to the supply tank. When the water supply pressure is higher than the foam concentrate supply pressure, the globe valve closes to increase the pressure and flow of water to the balanced pressure proportioner.

Diaphragm valves currently used in known foam fire fighting systems possess significant disadvantages. The globe valves in the diaphragm valve, used to regulate the supply of foam and water, are expensive. Since such valves incorporate a flexible diaphragm, the diaphragm must be intact, that is, without holes or other perforations, in order for the valve to function. Thus, when the diaphragm is perforated, the valve will not operate properly. Also, the use of a flexible material for the diaphragm allows the diaphragm to have slightly different surface areas on each side, due to variations in the material, and these variations affect the accuracy of the valve over a large pressure range. Many diaphragm valves include springs. The springs are prone to fatigue and failure. In diaphragm valves with springs, the pressure equalization of the foam line pressure to the water line pressure is not always accurate over the entire pressure range because the springs do not have a constant coefficient of elasticity. In addition, the pressure equalization will tend to change as the springs age.

OBJECTS AND SUMMARY OF THE INVENTION

It is accordingly an object of the present invention to provide a pressure equalizing valve that overcomes the aforesaid defects of the prior art.

It is another object of the present invention to provide a pressure equalizing valve that has a simple design.

It is still another object of the present invention to provide a pressure equalizing valve with a minimum of moving parts.

It is yet another object of the present invention to provide a pressure equalizing valve with only a single moving part.

It is an even further object of the present invention to provide a reliable pressure equalizing valve.

It is still a further object of the present invention to provide a pressure equalizing valve that is accurate over a large operating range.

It is a still further object of the present invention to provide a pressure equalizing valve that is simple in operation.

It is yet another object of the present invention to provide a low cost pressure equalizing valve.

In accord with the present invention, a pressure equalizing valve comprises a valve body with first and second end faces, the body having a longitudinally disposed bore therein, an inlet port, first and second outlet ports, a first sense port disposed in the first end face, and a second sense port disposed in the second end face, with the ports in fluid communication with the bore. A spool means with first and second pistons having first and second faces, respectively, is disposed in the bore for longitudinal movement therein to regulate fluid communication from the inlet port to the outlet ports in response to a pressure differential between the first and second sense ports. First and second sealing means are disposed proximate the first and second faces of the pistons, respectively, and seal the inlet port and the outlet ports from the first and second sense ports, respectively.

The above, and other objects, features and advantages of the present invention will be apparent from the following detailed description taken in conjunction with the accompanying drawings.

DETAILED DESCRIPTION OF THE PREFERRED EMBODIMENT

Figure 1:
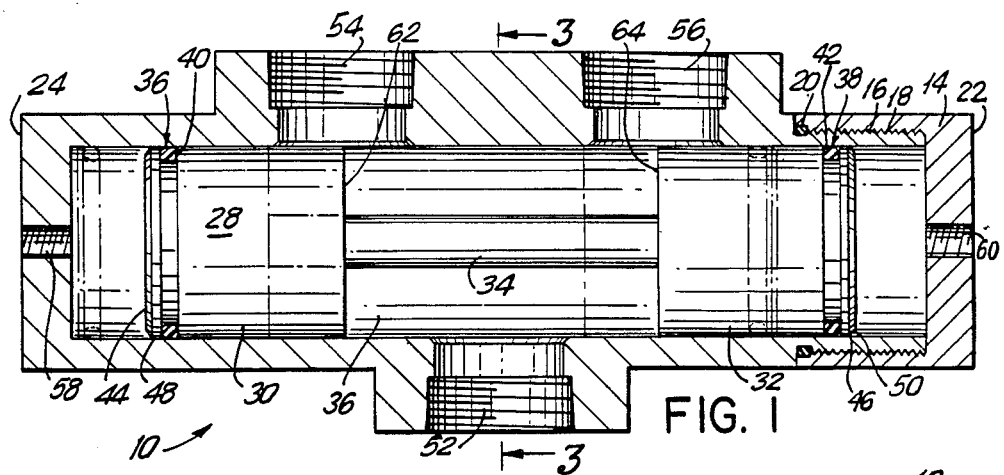
FIG. 1 is a cross-sectional view of an embodiment of a pressure equalizing valve in accord with the present invention.
Figure 2:
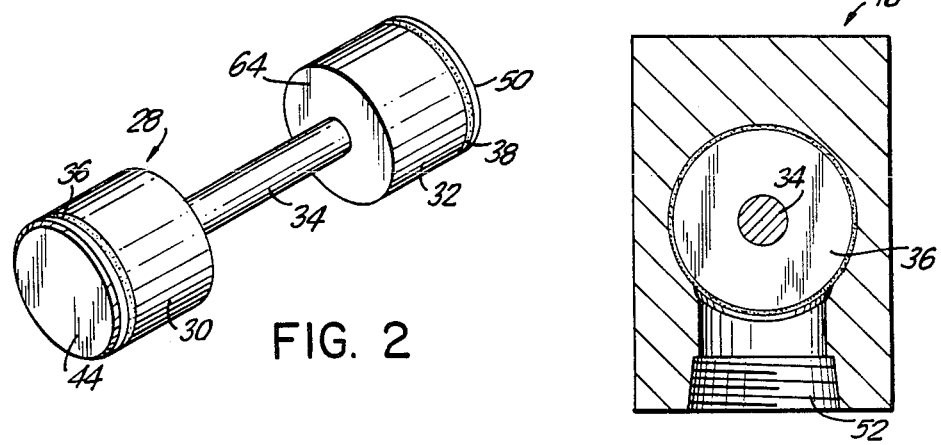
FIG. 2 is a perspective view of a spool used in the embodiment of FIG. 1.

Referring to the drawings, and initially to FIGS. 1 and 2 thereof, a pressure equalizing valve 10 according to an embodiment of the present invention includes a valve body 12 with an end cap 14. End cap 14 includes threads 16 mating with threads 18 on valve body 12. Seal 20 provides a seal between end cap 14 and valve body 12. In the illustrated embodiment, valve body 12 has a generally cylindrical shape with a first end face 22 on end cap 14 and a second end face 24. A person of ordinary skill in the art will recognize that valve 10 can be made with two end caps 14, one on each end of valve body 12. A longitudinally disposed bore 26 is included within valve body 12 and is substantially centered about the longitudinal axis of valve body 12.

A spool 28 is disposed in bore 26 for longitudinal movement therein. Spool 28 includes a first piston 30, a second piston 32, and a reduced portion or neck 34 connecting pistons 30, 32. In the illustrated embodiment, spool 28 is substantially cylindrical in shape to fit smoothly within bore 26 of valve body 12. Pistons 30, 32 have a first diameter substantially equal to the diameter of bore 26. However, the diameter of pistons 30, 32 is slightly smaller than the diameter of bore 26 so that spool 28 can slide within bore 32. A tight fit is, of course, made between spool 28 and bore 26.

First and second seals 36, 38 are disposed in circumferential grooves 40, 42, respectively, in spool 28. Seals 36, 38 prevent fluid communication between the space or chamber defined by reduced portion 34 and the space in bore 26 between pistons 30, 32, and the end walls of bore 26, as will be discussed hereinbelow.

Pistons 30, 32 terminate with end faces 44, 46 having bevelled edges 48, 50, respectively.

Valve body 12 includes an inlet port 52 and first and second outlet ports 54, 56. Inlet port 52 and outlet ports 54, 56 are threaded to connect to input and output lines. As will be discussed more fully hereinbelow with regard to FIG. 5, inlet port 52 is connected to a line that supplies foam concentrate under pressure from a foam concentrate pump. The foam concentrate supplied through inlet port 52 has a pressure that is constant and that is equal to the highest possible pressure of the water plus a safety factor. First outlet port 54 is connected to a by-pass line. (See FIG. 5). Second outlet port 56 is connected to a line supplying foam concentrate to a balanced pressure proportioner (see FIG. 5). First outlet port 54 is disposed a predetermined distance from second outlet port 56. This distance coincides with the longitudinal length of reduced portion 34 of spool 28. The relationship between the distance between outlet ports 54, 56 and the longitudinal length of spool 28 will be discussed more fully hereinbelow.

Valve body 12 includes a water sensing port 58 located on first face 24 thereof. Valve body 12 also includes a concentrate sensing port 60 on second face 22. Water sensing port 58 and concentrate sensing port 60 are threaded to receive lines supplying water and foam concentrate, respectively.

As will be evident to those of ordinary skill in the art, since the diameters of pistons 30, 32 are approximately equal, the end faces 44, 46 of pistons 30, 32 are approximately equal. Thus, when the pressure of the water at water sensing port 58 is approximately equal to the pressure of the foam concentrate at concentrate sensing port 60, spool 28 will be approximatey centered in bore 26, since equal pressures will be applied thereto. In this position, as illustrated in the dark lines in FIG. 1, the flow of concentrate from inlet port 52 is approximately equally divided between first outlet port 54 and second outlet port 56. As the pressure differential between water sensing port 58 and concentrate sensing port 60 varies, spool 28 will move longitudinally in response thereto, thereby equalizing the pressures between the two inputs. The longitudinal movement of spool 28 affects the flow of foam concentrate through the chamber defined by reduced portion 34 of spool 28, as will be discussed more fully below.

In the illustrated embodiment, reduced portion 34 is a substantially cylindrical member connecting pistons 30, 32. As will be evident to those of skill in the art, other configurations of reduced portion 34 will be suggested.

First and second seals 36, 38, it will now be appreciated, prevent fluid communication from the space between the end walls of bore 26 adjacent water sensing port 58 and concentrate sensing port 60, respectively, and the chamber in bore 26 defined by pistons 30, 32 and reduced portion 34.

Figure 3:
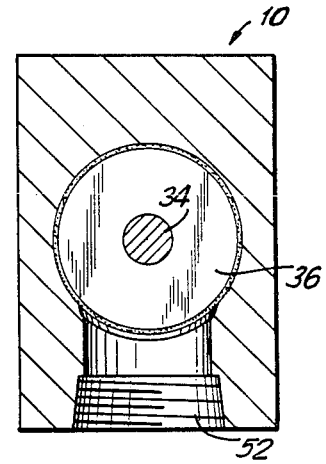
FIG. 3 is a cross-sectional view taken along the lines 3—3 of FIG. 1.

Referring to FIG. 3, the diameter of reduced portion 34 of spool 28 is clearly smaller as compared with the substantially larger diameter of pistons 30, 32.

Figure 4:
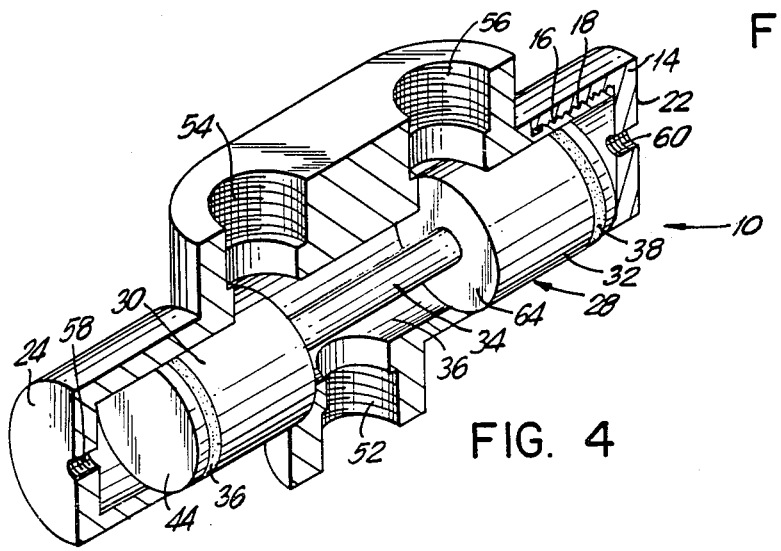
FIG. 4 is a perspective, cutaway view of the valve of FIG. 1.

FIG. 4 illustrates the external finish of housing 12. Outlet ports 54, 56 are located on the cylindrical face of valve body 12. Further, concentrate sensing port 60 is disposed in end face 22 of end cap 14.

FIG. 1 in phantom illustrates valve 10 with spool 28 moved to the left from the position of the heavy lines of FIG. 1. Spool 28 moves to the left when the water pressure at water sensing port 58 is below the foam concentrate pressure at concentrate sensing port 60. Shoulder 62 of piston 30 has moved to the left from the position in heavy lines of FIG. 1, and thus permits more foam concentrate from inlet port 52 to flow through first outlet port 54. At the same time, shoulder 64 of piston 32 has moved to the left, whereby piston 32 blocks more of second outlet port 56 as compared to its position in heavy lines of FIG. 1. Thus, the flow of foam concentrate from inlet port 52 through second outlet port 56 is substantially reduced from the case illustrated in heavy lines of FIG. 1. As will be apparent, this coordinated decrease/increase in flow from inlet port 52 to outlet ports 54, 56 is dependent upon the coincidence of the distance between first outlet port 54 and second outlet port 56 and the length of reduced portion 34 of spool 28.

Figure 5:
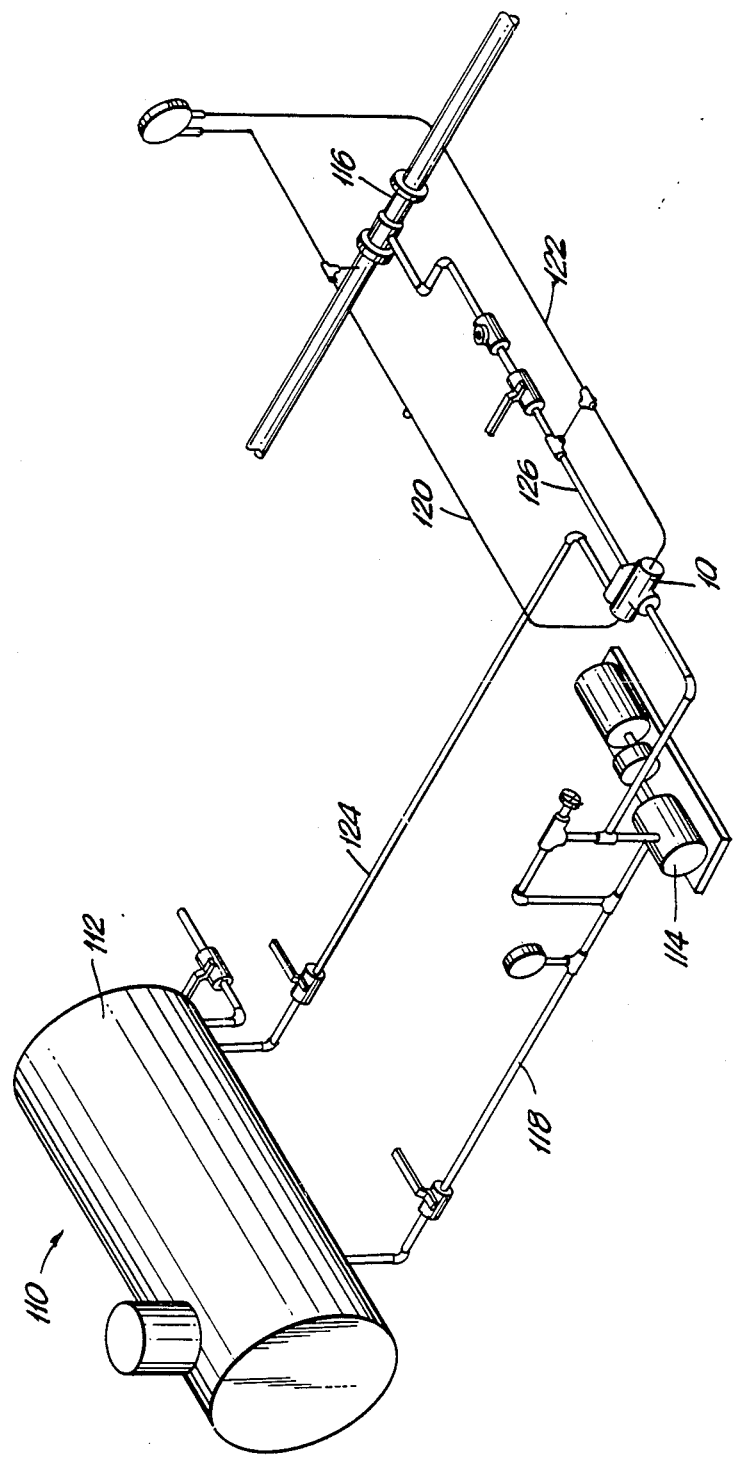
FIG. 5 is a diagrammatic view of a foam fire fighting system including a pressure equalizing valve of the present invention.

FIG. 5 is a diagrammatic view of a foam fire fighting system 110 including a valve in accord with the present invention. Foam fire fighting system 110 includes a foam concentrate supply tank 112, a foam concentrate pump 114, a pressure equalizing spool valve 10, and a balanced pressure proportioner 116. A line 118 connects foam concentrate supply tank 112 to foam concentrate pump 114. Foam concentrate pump 114 supplies foam concentrate under pressure to inlet port 52 of valve 10 (see FIG. 1). A water line 120 connects water sensing port 58 of valve 10 (FIG. 1) with a source of water. A foam concentrate line 122 connects concentrate sensing port 60 of valve 10 (see FIG. 1) to balanced pressure proportioner 116. A bypass line 124 connects outlet port 54 to foam concentrate supply tank 112. A concentrate line 126 connects outlet port 56 to balanced pressure proportioner 116.

The operation of a pressure equalizing valve in accord with the present invention is next to be described.

Once foam fire fighting system 110 is operating under stable conditions, if the water supply pressure drops, the pressure of the water in water line 120 transmits that drop in pressure through water sensing port 58 and thence, to the corresponding face 44 of spool 28. By assumption, the pressure of the foam concentrate at concentrate sensing port 60 is higher, so that the increased pressure on spool 28 from the foam concentrate causes spool 28 to move longitudinally to the left (as seen in phantom lines in FIG. 1). The longitudinal movement of spool 28 shifts reduced portion 34 of spool 28 to the left, thereby providing less resistance for fluid communication of the foam concentrate from inlet port 52 to outlet port 54 (and thence, to bypass line 124). Correspondingly, less foam concentrate from inlet port 52 flows to outlet port 56. In the extreme case, all fluid communication to outlet port 56 can be blocked. The resulting flow to the balanced pressure proportioner from outlet port 54 decreases proportionately to the water flow and pressure decrease.

Conversely, if the foam fire fighting system 110 of FIG. 5 is operating under stable conditions, and an increase in water pressure occurs, the increased water pressure at water sensing port 58 imports longitudinal rightward movement to spool 28 (as seen in FIG. 1). The relative movement of spool 28 provides relatively easier fluid communication of foam concentrate from inlet port 52 to outlet port 56 (and thence, to line 124). The longitudinal movement of spool 28 closes outlet port 54 in the extreme case, thereby blocking the foam concentrate flow from returning to foam concentrate supply tank 112 through bypass line 124. Equilibrium between water sensing port 58 and concentrate sensing port 60 in response to the pressure differential between the foam concentrate at concentrate sensing port 60 and the water at water sensing port 58 is thus assured by longitudinal movements of spool 28.

As will be apparent from the above description, a pressure equalizing valve in accord with the present invention employs only three metal parts and three O-rings. Only a single moving part is employed, i.e., spool 28. Spool 28 cannot fail to operate to provide equal pressure between water sensing port 58 and concentrate sensing port 60, since equal areas are provided on the pistons facing the two sensing ports. A pressure equalizing valve in accord with the present invention is very cost effective to manufacture because it uses very few parts, without close tolerances. Hence, large amounts of machining are not required to manufacture the valve. Still further, a pressure equalizing valve in accord with the present invention is particularly reliable and has low maintenance requirements, because it is relatively simple.

It is to be appreciated that the sensing pressure and the subsequent forces are applied to metallic parts, not flexible parts, as in prior art diaphragm valves. Thus, the areas where the fluid pressures are applied remain constant, and the valve is relatively more accurate than diaphragm valves across a large operating range.

A person of ordinarily skill in the art will appreciate that a pressure valve in accord with the present invention provides for simple operation and installation in a foam fire fighting system, because it reduces the amount of piping from the amount used in the prior art.

Pressure equalizing valves in accord with the present invention can be manufactured in range in size from ¼ inch to 6 inches.

Although an illustrative embodiment of the present invention has been described in detail herein with reference to the accompanying drawings, it is to be understood that the invention is not limited to that precise embodiment, and that various changes and modifications may be effected therein by one skilled in the art without departing from the spirit and scope of the invention as defined in the appended claims.

What is claimed is:

1. A pressure equalizing valve, comprising:
   a valve body with first and second end faces, said body having a longitudinally disposed bore therein, an inlet port for receiving a first pressurized fluid therethrough, an outlet port for transporting said first fluid downstream of said valve, a by-pass outlet port for transporting said first fluid away from said outlet port, a first sense port disposed in said first end face for sensing the pressure of said first fluid downstream of said valve, a second sense port disposed in said second end face for sensing the pressure of a source of a second pressurized fluid to be mixed with said first fluid downstream of said valve, said ports in fluid communication with said bore;
   spool means longitudinally disposed within said bore, said spool means formed with first and second piston means having first and second faces, respectively, said spool means freely translateable within said bore in response to a pressure differential between fluids at said first and second sense ports so as to allow said piston means to regulate the flow of said first fluid through said outlet and by-pass ports such that said first and second fluids maintain substantially equal pressures downstream of said valve; and
   first and second sealing means disposed proximate said first and second faces of said piston means, respectively, for sealing said inlet port , said outlet port , and said by-pass port from fluid communication with said first and second sense ports .

2. The valve of claim 1; therein said spool means fits tightly within said bore.

3. The valve of claim 2; wherein said bore has a first diameter, and each of said piston means has a second diameter; and wherein said first diameter is slightly greater than said second diameter.

4. The valve of claim 3; wherein said spool means includes a reduced portion defining a chamber with respect to said bore, said reduced portion having a diameter smaller than said second diameter of said piston means.

5. The valve of claim 4; wherein said chamber provides fluid communication from said inlet port to at least one of said outlet and by-pass ports.

6. The valve of claim 5; wehrein said reduced portion of said spool means has a longitudinal length; and wherein said outlet ports and by-pass are positioned in said valve body with a distance equal to said length therebetween.

7. The valve of claim 1; wherein each of said piston means includes a circumferential groove; and wherein each of said first and second sealing means comprises a seal disposed in the corresponding circumferential groove of said piston means.

8. The valve of claim 1; wherein said bore and said spool means are substantially cylindrical.

9. The valve of claim 1; wherein said valve body comprises a removable end cap, and a substantially cylindrical body means.

10. The valve of claim 9; and further comprising seal means for sealing said end cap to said cylindrical body means.